US009035237B2

United States Patent
Luling et al.

(10) Patent No.: US 9,035,237 B2
(45) Date of Patent: *May 19, 2015

(54) SYSTEMS AND METHODS USING TUNABLE DIFFERENTIAL GRAVIMETER

(71) Applicant: Schlumberger Technology Corporation, Sugar Land, TX (US)

(72) Inventors: Martin G. Luling, Paris (FR); Benjamin Levitt, Boston, MA (US); Martin Poitzsch, Derry, NH (US); Tancredi Botto, Cambridge, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 29 days.

This patent is subject to a terminal disclaimer.

(21) Appl. No.: 13/720,975

(22) Filed: Dec. 19, 2012

(65) Prior Publication Data

US 2013/0161503 A1     Jun. 27, 2013

Related U.S. Application Data

(60) Provisional application No. 61/578,846, filed on Dec. 21, 2011.

(51) Int. Cl.
G01V 5/12     (2006.01)
G01V 7/00     (2006.01)

(52) U.S. Cl.
CPC ... *G01V 5/12* (2013.01); *G01V 7/00* (2013.01)

(58) Field of Classification Search
CPC .................................. G01V 5/12; G01V 7/00
USPC ........................................................ 250/269.3
See application file for complete search history.

(56) References Cited

U.S. PATENT DOCUMENTS

| 3,146,624 | A | 9/1964 | Talbot |
| 3,335,613 | A | 8/1967 | Goodman |
| 4,815,448 | A | 3/1989 | Mills |
| 6,836,971 | B1 | 1/2005 | Wan |
| 7,633,058 | B2 | 12/2009 | Stoller et al. |
| 2010/0161226 | A1 | 6/2010 | Homan |
| 2013/0161501 | A1* | 6/2013 | Luling .......................... 250/254 |
| 2013/0161504 | A1* | 6/2013 | Luling ........................ 250/269.3 |

OTHER PUBLICATIONS

R. V. Pound & G. A. Rebka, "Variation with Temperature of the Energy of Recoil-Free Gamma Rays from Solids," Phy. Rev. Letters 4, 1960, pp. 274-275.
R. V. Pound & J. L. Snider, "Effect of Gravity on Nuclear Resonance," Phys. Rev. Letters, 13, (1964), pp. 539-540.
R. V. Pound & J. L. Snider, "Effect of Gravity on Gamma Radiation," Phys. Rev., 140B, (1965), pp . 788-804.

(Continued)

*Primary Examiner* — Marcus Taningco
(74) *Attorney, Agent, or Firm* — Stephanie Chi; Jody DeStefanis

(57) ABSTRACT

Systems and methods are provided for determining a property, e.g., density, of a geological formation based on Einstein's theory of gravitation. A gravitational potential difference is determined between two positions of the geological formation by measuring a frequency shift of radiation travelling from a source to an absorber of a differential gravimeter. The differential gravimeter can be a part of a downhole tool. The gravitational potential difference determined can be used to determine the property of the geological formation.

20 Claims, 9 Drawing Sheets

(56) References Cited

OTHER PUBLICATIONS

E. Ikonen et al, "Magnetic phase modulation of recoilless gamma radiation by nuclear Zeeman effect," Phys. Rev. Lett., 60 (1988), 643-646.

I. Tittonen et al, "Observation of Mössbauer resonance line splitting caused by Rabi oscillations," Phys. Rev. Lett., 69 (1992), pp. 2815-2818.

M. Lippmaa et al, "Mossbauer-NMR double resonance," Phys. Rev. B, 52 (1995) pp. 10268-10271.

T.W. Sinor et al, "Thermomechanical frequency modulation of $\gamma$ radiation," Phys. Rev. Lett., 66 (1991), pp. 1934-1937.

M. T. Hirvonen, T. Katila, K. Riski, and J. Tanttu, "Transmission of polarized $\gamma$ rays in a medium with anisotropic nuclear resonance absorption," Phys. Rev. B 24, 11, 1981.

Steven Weinberg, "Gravitation and Cosmology", Wiley (1972), ch. 3.5, pp. 82-83.

International Search Report for the equivalent PCT patent application No. PCT/US12/70453 issued on Feb. 25, 2013.

* cited by examiner

SYSTEMS AND METHODS USING TUNABLE DIFFERENTIAL GRAVIMETER

CROSS REFERENCE TO RELATED APPLICATIONS

This application claims the benefit of U.S. Provisional Application No. 61/578,846, filed Dec. 21, 2011.

BACKGROUND

Gravimetry is a type of measurement that has been used for reservoir characterization and gas-movement monitoring. Some commercially available gravimeters have been based on Newton's theory of gravitation. For example, Lacoste-Romberg gravimeters use a zero-length spring to monitor the gravitational force on a small test mass. Some gravimeters monitor the time of flight of a free-falling object or the oscillation time of a pendulum. More recently, some gravimetry measurements monitor the position of a superconducting niobium sphere suspended by a magnetic field.

In contrast to Newton's theory of gravitation, Einstein's theory of gravitation introduces a general relationship between a geometric structure of space-time and the presence of massive bodies. Einstein's theory predicts a time dilatation in the presence of a massive body. Such time dilatation is referred as "Gravitational Red Shift".

Nuclear spectroscopy offers a process that has been used to observe and confirm the gravitational red shift predicted by Einstein's theory of gravitation. For example, the isotope $^{57}$Fe nucleus can emit from its lowest excited state a 14.4 keV photon. This state can have an approximate lifetime of 140 nanosecond (ns), a spectral-line width of about $10^{-8}$ eV or a relative line width of about $9.2 \times 10^{-13}$. The Mossbauer effect recognizes that a nuclear transition has a high frequency precision, or narrow spectral line width, such as that of the $^{57}$Fe nucleus. The Mossbauer effect has successfully been used to measure/verify the gravitational red shift, as predicted by Einstein's theory of gravitation. Pound and Rebka in 1960 were the first to use a Mossbauer experiment to quantitatively confirm the gravitational red shift of Einstein's theory of gravitation.

SUMMARY

Generally, systems, methods and techniques are described that are directed to determining properties of a geological formation from a gravitational potential difference, by measuring a frequency shift of radiation resulting from the gravitational potential difference. As one example, the density of a geological formation may be determined.

In one embodiment, a system for determining a property of a geological formation is provided. The system includes a component contained in a downhole tool. The component measures a frequency shift of gamma radiation travelling from a first position of the component to a second position of the component. The frequency shift is resulting from a gravitational potential difference between the first position and the second position, which correspond to respective positions of the geological formation.

The component includes a source positioned at the first position. The source emits gamma radiation from the first position to the second position. An absorber is positioned at the second position to absorb the gamma radiation or a portion of the gamma radiation emitted from the source. A tuning mechanism is operatively connected to the source or the absorber or both to compensate the frequency shift and induce a resonant absorption of the gamma radiation emitted from the source by the absorber. A detector or detectors are operatively connected to the absorber. The detector(s) detect the absorption of the gamma radiation by the absorber and generate a signal or signals associated with the frequency shift. A processor or processors are operatively connected to the detector(s) to receive the signal or signals generated, determine the gravitational potential difference from the signal or signals received, and determine the property of the geological formation between the first and second positions based on the gravitational potential difference determined.

In another embodiment, a method is provided for determining a property of a geological formation. The method includes generating gamma radiation at a first position of the geological formation, and emitting the gamma radiation from the first position to a second position of the geological formation. The gamma radiation travelling from the first position to the second position has a frequency shift resulting from a gravitational potential difference of the geological formation between the first and second positions. The method further includes compensating the frequency shift of the gamma radiation to induce a resonant absorption of the gamma radiation, and absorbing the gamma radiation or a portion of the gamma radiation at the second position of the geological formation. The method further includes detecting the absorption of the gamma radiation and generating a signal or signals associated with the frequency shift, determining the gravitational potential difference based on the signal or signals generated, and determining the property of the geological formation between the first and second positions based on the gravitational potential difference determined.

This summary is provided to introduce a selection of concepts that are further described below in the detailed description. This summary is not intended to identify key or essential features of the claimed subject matter, nor is it intended to be used as an aid in limiting the scope of the claimed subject matter.

DETAILED DESCRIPTION

Systems, methods and techniques are described herein for determining a property of a geological formation based on Einstein's theory of gravitation.

Einstein's theory predicts a time dilatation in the presence of a massive body. For example, in the presence of the earth, the frequency f of radiation at two positions of a geological formation can be different if there is a gravitational potential difference between these two positions. The radiation can be, for example, a nuclear spectral line at a certain energy or frequency. For example, the nucleus of isotope $^{57}$Fe can emit a 14.4 keV photon with a spectral-line width of about $10^{-8}$ eV. At a first position of the geological formation, the nuclear spectral line of the radiation has a frequency $f_1$ and at a second position of the geological formation, the frequency can change to be $f_2$. The frequency difference $\delta f = f_1 - f_2$ can be expressed as:

$$\delta f = f_1 - f_2 = \left[ \sqrt{1 - \frac{2}{c^2}\Phi(M, r_1)} - \sqrt{1 - \frac{2}{c^2}\Phi(M, r_2)} \right] f_0 \quad (1)$$

where $r_1$ is the radius of the first position of the geological formation; $r_2$ is the radius of the second position of the geological formation; $\Phi(M, r_1)$ is the gravitational potential at the first position; $\Phi(M, r_2)$ is the gravitational potential at the second position; $f_0$ is the frequency of the radiation in the absence of any heavy body; c is the speed of light in vacuum; and M is the mass of the earth.

An approximation of Equation (1) can be $$\delta f = f_1 - f_2 \cong [\Phi(M, r_1) - \Phi(M, r_2)] \frac{f_0}{c^2} \quad (2)$$

Equation (1) or (2) illustrates the relationship between a frequency shift and a gravitational potential difference.

A gravitational potential difference, such as $\delta\Phi(M, r_1) = [\Phi(M, r_1) - \Phi(M, r_2)]$, can be determined from a measured frequency shift, such as $\delta f = f_1 - f_2$, by $$\delta\Phi(M, r_1) = [\Phi(M, r_1) - \Phi(M, r_1 - \delta r)] \cong 2\frac{f_1 - f_2}{f_1 + f_2}c^2 \quad (3)$$

where $\delta r = r_1 - r_2$ is a vertical distance between the first and second positions. The vertical distance described herein refers to a distance in the direction of a gravitational force.

A property of the geological formation, e.g., the average formation density between the first and second positions, can be determined from the gravitational potential difference determined, which will be described further below.

Figure 1:
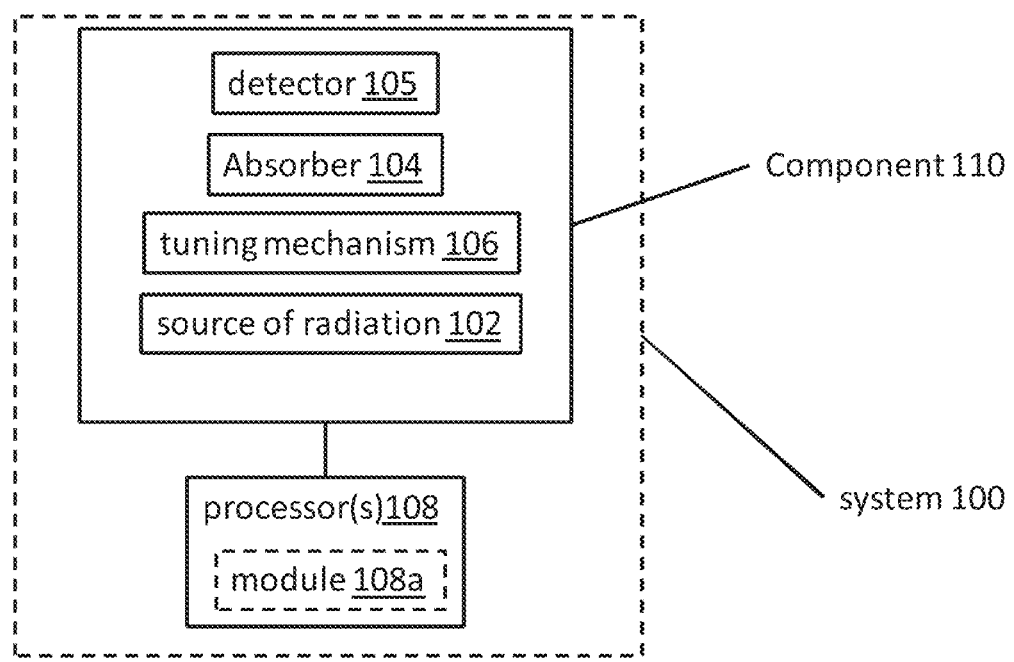
FIG. 1 illustrates a schematic diagram of an example system described herein.

FIG. 1 illustrates an example system 100 for determining a property of a geological formation. The system 100 can be associated with an instrument, e.g., a downhole tool, but may not be limited to a downhole tool. The system 100 includes a component 110 and at least one processor 108 operatively connected to the component 110. The component 110 can have a differential gravimeter that includes a source 102 to generate radiation, an absorber 104 to absorb the radiation from the source 102, and a tuning mechanism 106. The processor 108 is operatively connected to the component 110 for receiving and/or sending signal(s) from/to the component 110 and processing the signal(s). The processor 108 can include one or more modules, e.g., 108a, to help with processing measurements and/or signals.

The source 102 generates radiation, e.g., gamma radiation, emitted to the absorber 104. The radiation travelling from the source 102 to the absorber 104 can have a frequency shift resulted from a gravitational potential difference between the position of the source 102 and the position of the absorber 104. This frequency shift can be compensated by the tuning mechanism 106, which is operatively connected to at least one of the source 102 and the absorber 104, such that the radiation can be resonantly absorbed by the absorber 104. Resonance absorption described herein can refer to an absorption process where the frequency of incoming photons to be absorbed agrees with a characteristic resonance frequency of an absorbing material. For example, if the two frequencies match within a spectral line width of the photons, the resonance absorption can occur. The probability of a resonance absorption process can be measured by a resonance absorption cross section which can be related to the wavelength of photons.

A detector 105 can be operatively connected to the absorber 104 to detect the absorption and generate one or more signals associated with the frequency shift. The signal(s) are received and processed by the processor 108. The processor 108 may send control signals to the component 110 to control its operation. It will be appreciated that one or more processors can be used. The processor 108 can include one or more modules, e.g., 108a, further described below to help with processing measurements and/or signals.

The system 100 can be used to determine a property of a geological formation. In one embodiment, a density of the geological formation can be determined by the system 100. It will be appreciated that other properties of the geological formation may be determined separate from and/or in addition to the formation density, e.g., fluid compositions, the change of the formation density, and/or the gravitational potential difference(s). For example, the system 100 can be used to monitor changes in fluid composition of the geological formation. The formation density may be influenced by, for example, fluid content, mineralogy, and/or lithology. A density change may be due to, for example, a change in fluid content such as, for example, from relative contents of gas and water, and/or compaction of rock during depletion.

The source 102 and the absorber 104 can include at least one isotope, for example, $^{57}$Fe, $^{67}$Zn, $^{109}$Ag, $^{107}$Ag, $^{103}$Rh, and $^{189}$Os, etc. The term "isotope" described herein can include a nuclear isomer, which is, for example, a metastable state of an atomic nucleus caused by the excitation of one or more of its nucleons. Table 1 summarizes some properties of example isotopes that may be employed. It is to be understood that other isotopes suitable for resonance absorption can also be used. In one embodiment, the source 102 and the absorber 104 can include the same isotope(s), for example, the absorber 104 can be a crystal including the same decay material or isotope(s) as the source 102.

TABLE 1

Properties of isotopes

| Isotope | Energy [keV] | Lifetime | Natural Line Width [eV] | Resolution | Recoilless Fraction | Half life of Parent |
|---|---|---|---|---|---|---|
| $^{57}$Fe | 14.4 | 140 ns | $1.3 \times 10^{-8}$ | $9.2 \times 10^{-13}$ | 0.7* | 270 days |
| $^{67}$Zn | 93.3 | 9.4 µs | $1.4 \times 10^{-11}$ | $1.5 \times 10^{-15}$ | 0.0212 | 78 hr |
| $^{107}$Ag | 93.5 | 63 s | $1.05 \times 10^{-17}$ | $1.1 \times 10^{-22}$ | 0.0377 | 6.5 hr |
| $^{109}$Ag | 88 | 57 s | $1.16 \times 10^{-17}$ | $1.3 \times 10^{-22}$ | 0.0535 | 464 days |
| $^{103}$Rh | 39.75 | 81 min | $1.35 \times 10^{-19}$ | $3.4 \times 10^{-24}$ | 0.756 | 11.96 days |
| $^{189}$Os | 30.8 | 8.7 hr | $2.1 \times 10^{-20}$ | $6.8 \times 10^{-25}$ | 0.905 | 13 days |

*at room temperature (about 300 K).
Reference(s): A. Davydov, Hyperfine Interactions, 135 (2001), 125-153.

In one embodiment, a beta-radioactive isotope of an element, such as one of the isotopes listed in Table 1, can be included in the source 102 and/or the absorber 104. The isotope can exist in, for example, a monocrystalline form, a ceramics form, or metals. The beta decay of the isotope can emit an associated photon from an excitation state with a lifetime τ. The line width $\Gamma = \hbar/\tau$ ($\hbar$ is Planck's constant) can be as narrow as the line widths for example listed in Table 1, and a gravimeter can have a resolution comparable to the resolutions listed in Table 1. As listed in Table 1, the values of the resolution can be obtained from the natural line width divided by the energy.

Figure 2:
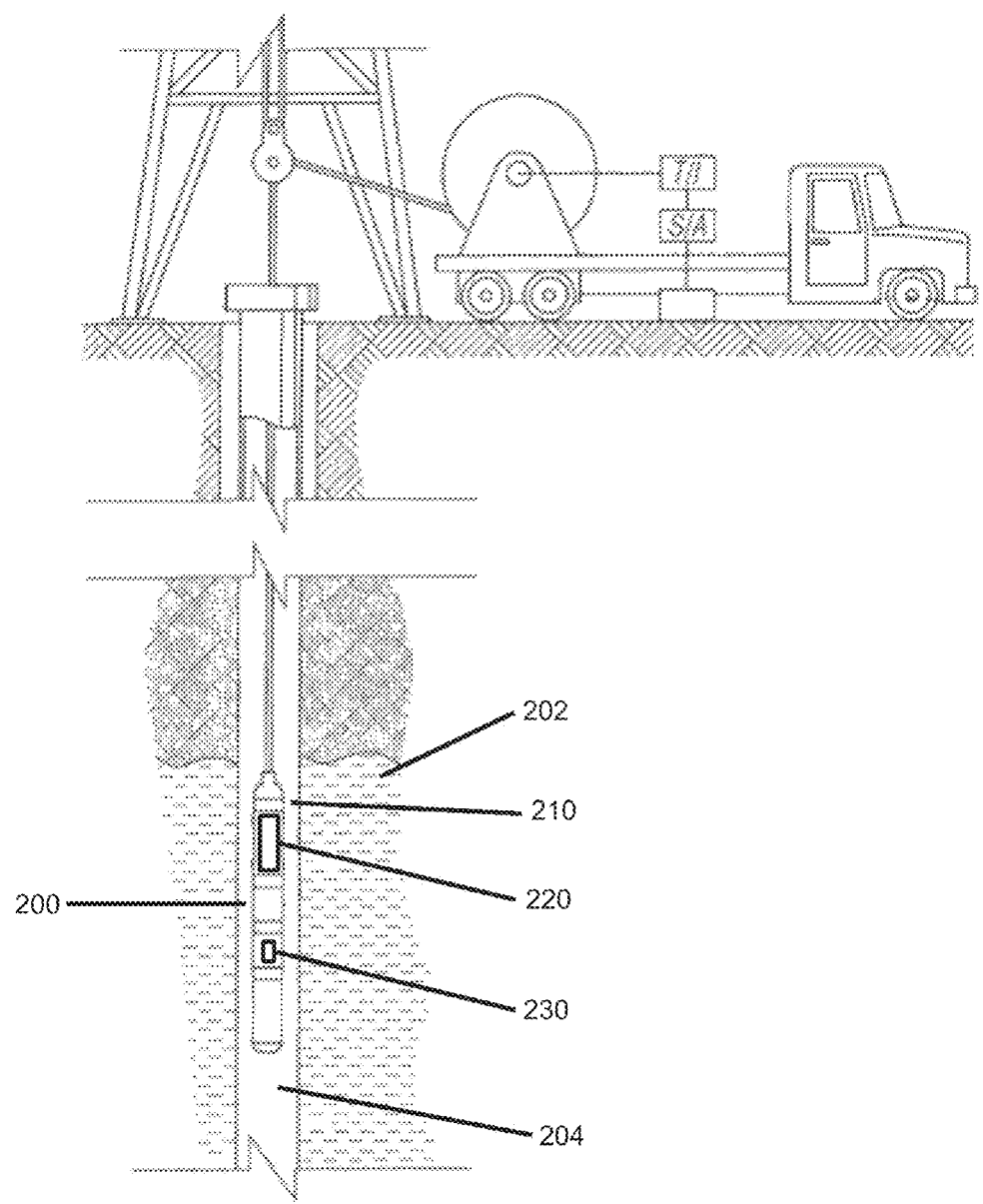
FIG. 2 illustrates a schematic diagram of one embodiment of a system described herein including an instrument, for example, a wireline tool suspended in a wellbore.
Figure 3:
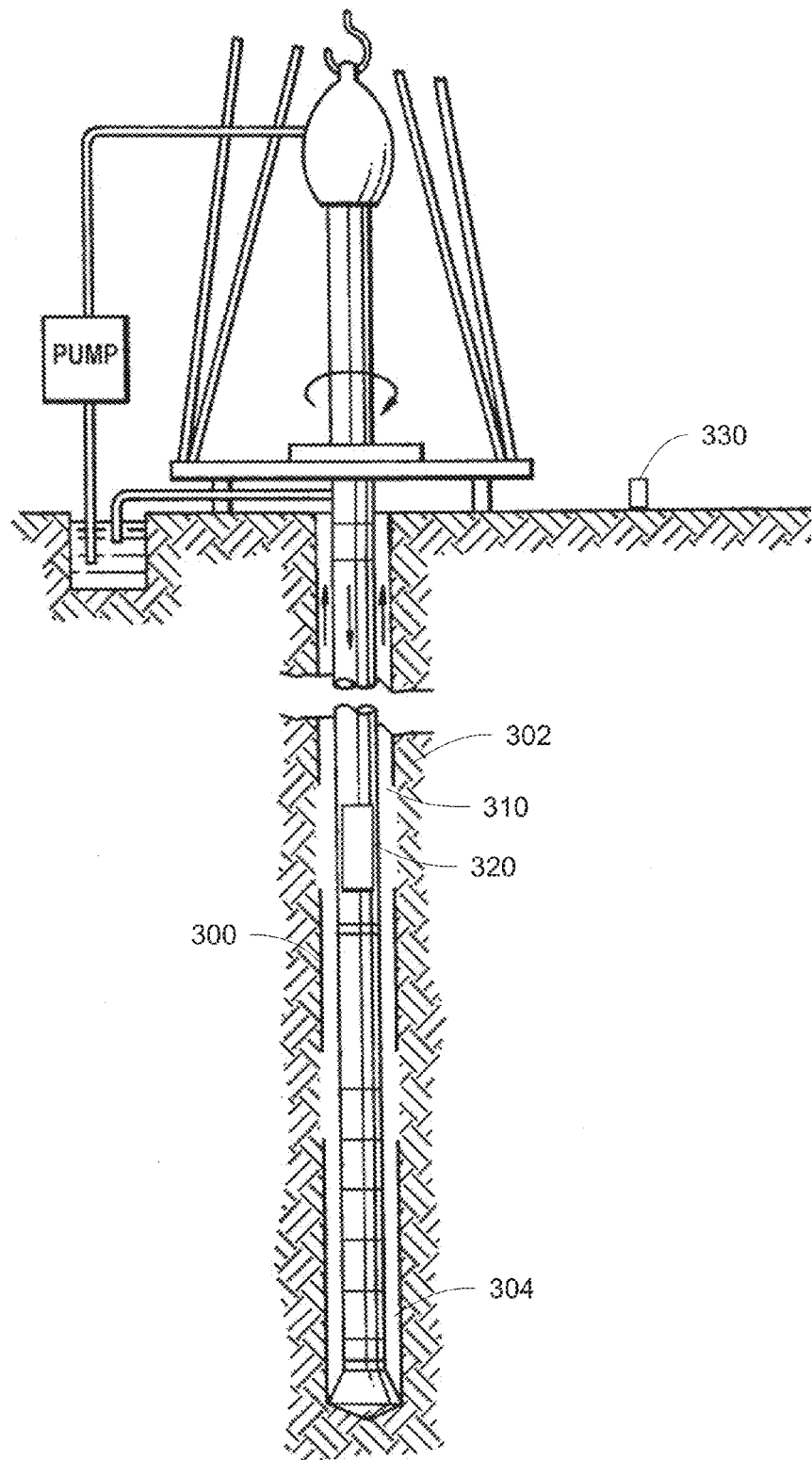
FIG. 3 illustrates a schematic diagram of one embodiment of another system described herein including an instrument, for example, a measurement-while-drilling (MWD) or logging-while-drilling (LWD) tool disposed in a wellbore.

FIGS. 2 and 3 illustrate implementations of systems, for example, in downhole tools. In some embodiments, a downhole tool can incorporate the system 100 of FIG. 1. In other embodiments, a downhole tool can itself be the system 100 of FIG. 1. FIG. 2 illustrates a schematic diagram of one embodiment of a system 200 including a component 220 for determining a property of a geological formation 202. The system 200 can determine a gravitational potential difference between two positions of the geological formation 202 from a measured frequency shift of radiation traveling between the two positions, based on the relationship described, for example, in Equation (3). A property of the geological formation 202 can be determined from the gravitational potential difference determined. For example, a density of the geological formation 202 can be derived from the gravitational potential difference, which will be discussed further below. It will be appreciated that other properties of the geological formation 202, for example, a formation compaction due to depletion, and/or changes in fluid composition of the geological formation such as changes in fluid composition from gas to water, may also be determined from the gravitational potential difference determined.

The system 200 includes an instrument 210 and a component 220 positioned within the instrument 210. The component 220 can be the component 110 of FIG. 1. In this embodiment, the instrument 210 can be a downhole tool, for example, a wireline tool that can be suspended in a wellbore 204. The wellbore 204 can be vertical, more or less deviated from vertical or even substantially horizontal. It is to be understood that the instrument 210 is not limited to a wireline tool and can be a measurement-while-drilling (MWD) tool, a logging-while-drilling (LWD) tool, a coiled tubing tool, a testing tool, a completions tool, a production tool, or combinations thereof, depending on the applications. For example, FIG. 3 illustrates a measurement-while-drilling/logging-while-drilling tool disposed in a wellbore which will be discussed below.

In one embodiment, as the downhole tool 210, runs over an extended depth interval, within the wellbore 204, the tool 210 may serve to identify and monitor density changes, possibly due to, for example, fluid fronts displacing gas or water encroaching in an asymmetrical fashion toward the depth interval. The extended depth interval refers to, for example, the thickness of a hydrocarbon reservoir, possibly several tens of meters, which can be much larger than a measurement interval of the tool 210. In one embodiment, the tool 210 can be used to determine within the extended depth interval the position of a formation-density change, for example, the change from the low-density gas zone to the high-density water zone below, where the interface can change, for example, from year to year, as gas is being produced-depleted.

A processor 230 is operatively connected to the component 220 for receiving/sending signal(s) from/to the component 220 and processing the signal(s). In this embodiment, the processor 230 is positioned within the downhole tool 210. In other embodiments, the processor 230 can be positioned outside of the downhole tool 210. For example, FIG. 3 illustrates a processor positioned above the wellbore, e.g., on the surface. It is to be understood that one or more processors can be used.

As shown in FIG. 2 (and also FIG. 3), the downhole tool 210/310 is positioned in a land based rig. It will be appreciated that the downhole tool 210/310 can also be deployed in other ways such as, for example, from an offshore platform.

FIG. 3 illustrates a schematic diagram of one embodiment of another system 300 including a component 320 for determining properties of a geological formation. Similar to the system 200 shown in FIG. 2, the system 300 includes an instrument 310, e.g., a downhole tool, and a component 320 positioned within the instrument 310. The component 320 can be the component 110 of FIG. 1 or the component 220 of FIG. 2. In this embodiment, the instrument 310 is a downhole tool such as a measurement-while-drilling (MWD) or logging-while-drilling (LWD) tool that can be disposed in a wellbore 304 about a geological formation 302.

A processor 330 is operatively connected to the component 320 for receiving/sending signal(s) from/to the component 320 and processing the signal(s). In this embodiment, the processor 330 is positioned on the surface. It will be appreciated that the processor 330 can be a part of the component 320 and/or on the downhole tool 310. It will be also appreciated that one or more processors can be used.

In the embodiments of FIGS. 2 and 3, the geological formation 202, 302 is a subterranean formation penetrated by the wellbore 204, 304. It will be appreciated that the geological formation 202, 302 does not have to be a subterranean formation. The system 200, 300 can be applied for other geological formations generally above and/or below the ground. For example, the geological formation 202, 302 can be a seafloor and the component 220, 320 can be positioned on the sea floor.

Figure 4:
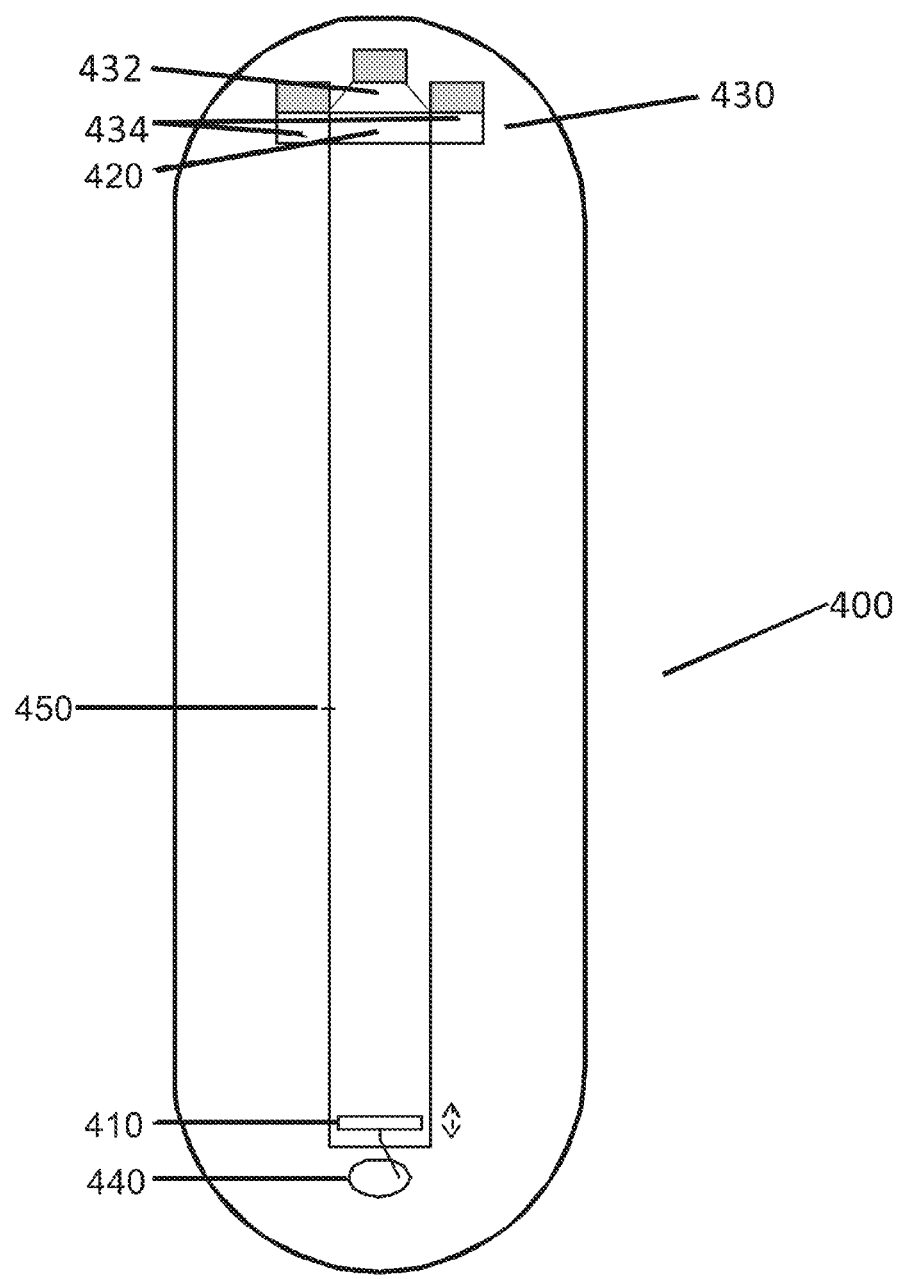
FIG. 4 illustrates a schematic diagram of an example component that includes a differential gravimeter described herein with a mechanical modulator for compensating the frequency shift of a radiation from a source.
Figure 5A:
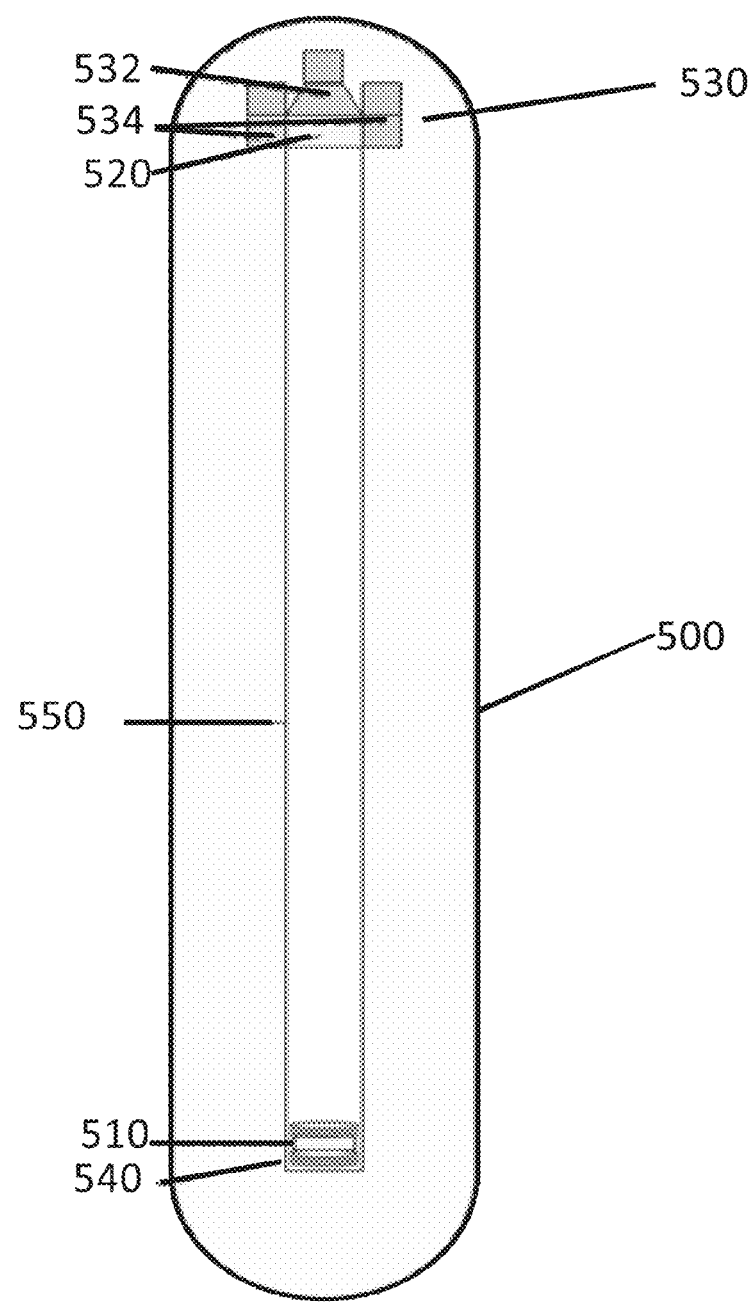
FIG. 5a illustrates a schematic diagram of another example component that includes a differential gravimeter described herein with a magnetic modulator for compensating the frequency shift of a radiation from a source.

FIGS. 4 and 5 illustrate examples of a component including a differential gravimeter for measuring a property of a geological formation. The differential gravimeter described herein applies Einstein's theory of gravitation for determining a gravitational potential difference between positions within a geological formation. Each differential gravimeter of FIGS. 4 and 5 can include a tuning mechanism, such as the tuning mechanism 106 of FIG. 1. In FIG. 4, the tuning mechanism is a mechanical modulator. In FIG. 5a, the tuning mechanism is a magnetic modulator.

FIG. 4 illustrates a schematic diagram of one example of a component such as, for example, the component 110 of FIG. 1. The example component includes a differential gravimeter described 400 herein with a mechanical modulator for compensating the frequency shift of radiation from a source. The differential gravimeter 400 can be a part of the wireline tool 210 of FIG. 2, or a part of the measurement-while-drilling/logging-while-drilling tool 310 of FIG. 3. It will be appreciated that the differential gravimeter 400 can be a part of other downhole tools, including a coiled tubing tool, a testing tool, a completions tool, a production tool, or combinations thereof, depending on specific applications. In one embodiment, the gravimeter 400 can be located above a resistivity tool that may be present on a downhole tool and be a part thereof, such as the wireline tool of FIG. 2 or the MWD/LWD tool of FIG. 3. Resistivity tools of downhole tools are known in the art.

The differential gravimeter 400 of FIG. 4 includes a source 410 mounted toward one end of a housing 450. An absorber 420 can be mounted at the opposite end of the housing 450, generally facing the source 410, to receive at least a portion of radiation generated by the source 410. In one embodiment, the housing 450 is constructed as a tube or a conduit to provide a line-of-sight contact between the source 410 and the absorber 420. It will be appreciated that the source 410 and the absorber 420 can be mounted at other positions of the housing 450 as long as the radiation emitted from the source 410 can transmit to the absorber 420.

The source 410 and the absorber 420 can include at least one isotope, for example, $^{57}$Fe, $^{67}$Zn, $^{109}$Ag, $^{107}$Ag, $^{103}$Rh, or $^{189}$Os. In one embodiment, the source 410 and the absorber 420 include the same type of isotope. The isotope can be in the form of, for example, a crystal plate which can serve to absorb emission-recoil energy from photons emitted. It will be appreciated that the isotope may be in other suitable forms. For example, the source 410 and the absorber 420 can use a metal slice made out of an isotope or a suitable alloy in which an isotope is embedded in a metal-crystal structure so that the metal slice or the alloy can serve as a whole to absorb the emission-recoil energy. In some embodiments, the source 410 and the absorber 420 can include single crystal(s) thermally diffused with isotope(s), metal foil(s) enriched with isotope(s), and/or crystal powders containing isotope(s).

The source 410 can generate radiation, for example, gamma radiation, at a desired narrow spectral line. It will be appreciated that the radiation could come from a variety of sources. For example, Table 1 above lists examples of natural line widths for spectral lines emitted by example nuclear isotopes. It is to be understood that the line width of gamma radiation is not limited to the listed line widths of Table 1. In other embodiments, radiations having frequency/energy that may be different from gamma radiation may be used as long as the radiation can be comparable to that of a gamma radiation, for example, having a spectral line width such as the natural line widths listed in Table 1.

The gamma radiation generated from the source 410 transmits to the absorber 420 which can absorb at least a portion of the gamma radiation. In one embodiment, the housing 450 can include a tube or a conduit filled with transmission media to reduce radiation absorption before the gamma radiation arrives at the absorber 420. For example, light gases such as, for example, helium or hydrogen can be used as transmission media to remove relatively heavy elements such as, for example, argon. In another embodiment, the space between the source 410 and the absorber 420 can be in a vacuum to reduce radiation absorption during transmission.

A detector can be operatively connected to the absorber 420 to detect the absorption of gamma radiation. It will be appreciated that one or more detectors may be employed. In the embodiment of FIG. 4, the detector is constructed as a detector assembly 430 including a transmission detector 432 and two side-scatter detectors 434, to detect the absorption. In other embodiments, the assembly 430 can include the transmission detector 432 without including the side-scatter detector 434. It will be appreciated that one or more transmission detectors and/or one or more side-scatter detectors may be used in any suitable combinations.

In the embodiment of FIG. 4, the transmission detector 432 can be positioned in a forward direction, behind the absorber 420 relative to the source 410, to detect reduced photon flux or a diminishing of the gamma radiation due to the absorption by the absorber 420. The forward direction described herein refers to the direction of radiation travelling from a source to an absorber. In some embodiments, with the absorption of the gamma radiation, the absorber 420 can re-emit photons, which can be detected away from the forward direction by a side-scatter detector, such as the side-scatter detector 434. In this embodiment, two side-scatter detectors 434 are positioned on each side of the absorber 420. It is to be understood that one or more side-scatter detectors can be positioned, for example, on one side of the absorber 420. In another embodiment, the absorption can be detected by one or more transmission detectors without using a side-scatter detector. The transmission detector and/or the side-scatter detector can include, for example, a scintillation crystal coupled to a photomultiplier tube, and/or a solid-state detector such as for photons.

The gamma radiation generated by the source 410 travels from the source 410 to the absorber 420. For example, the frequency of the gamma radiation shifts due to the gravitational potential difference between the positions of the source 410 and the absorber 420. For example, if the source 410 and the absorber 420 are in positions with different gravitational potential, they encounter different time dilatation. The respective gamma radiation, for example, nuclear spectral lines of the source 410 and the absorber 420 are slightly frequency shifted with respect to each other, and there would be relatively less resonant absorption and/or re-emission compared to the situation without such frequency shift.

Such frequency shifts can be compensated by a tuning mechanism, such as the mechanical modulator 440 of FIG. 4, so that the radiation can be resonantly absorbed by the absorber 420. In one embodiment, the mechanical modulator 440 can be operatively connected to the source 410 such that the source 410 can move relative to the absorber 420. The movement of the source 410 can generate a frequency shift of the gamma radiation emitted therefrom. In one embodiment, the frequency shift can be a Doppler shift which can be used to compensate the frequency shift due to the gravitational potential difference. Here, Doppler shift refers to a change in frequency of a wave for an object moving relative to the source of the wave. For example, relative movements between a source and an absorber generate a Doppler shift, where the frequency of radiation emitted from the source or received by the absorber can be changed. In the embodiment of FIG. 4, the source 410 can be mounted on a platform and driven by a piston having an eccentered wheel. It will be appreciated that the modulator 440 is not limited to the specific structure of FIG. 4 and other types of modulators that can generate relative movements between the source 410 and the absorber 420 sufficient to induce a shift (e.g., Doppler shift) in gamma radiation frequency may be used. The relative velocity between the source 410 and the absorber 420 can be, for example, in a range from nm/second to mm/second. It will be appreciated that the relative velocity may vary according to the natural line widths of the isotopes of the source 410 and/or the absorber 420. In some embodiments, a piezoelectric modulator can also be used to move the source and/or the absorber. It will be appreciated that the relative movements between the source and absorber can be generated by various means. For example, a permanent magnet inside a solenoidal coil driven with an alternating current can also be used as an actuator modulator.

The source 410 and/or the absorber 420 can be moved, for example, in an oscillatory manner toward and away from each other. This movement causes a shift (e.g., Doppler shift) in photon energy and frequency. Oscillation speeds in a range, for example, 10 nm/second to 10 mm/second, can be sufficient to sweep the emitted and resonantly absorbed spectral lines past each other. It will be appreciated that other oscillation speeds may be suitable.

It will be appreciated that the mechanical modulator 440 can be operatively connected to the absorber 420 to move the absorber 420 relative to the source 410 to generate a shift (e.g., Doppler shift) so that the frequency shift of the radiation due to the gravitational potential difference can be compensated.

It will be appreciated that the absorber 420 and the source 410 each can be operatively connected to one or more mechanical modulators, such as the mechanical modulator 440, and the absorber 420 and the source 410 can be moved independently or simultaneously to generate relative movements and to generate a shift (e.g., Doppler shift) such that the frequency shift of the radiation due to the gravitational potential difference can be compensated.

FIG. 5a illustrates a schematic diagram of another example of a component such as, for example, the component 110 of FIG. 1, that includes a differential gravimeter 500 described herein with a magnetic modulator for compensating the frequency shift of the radiation resulted from the gravitational potential difference. The differential gravimeter 500 can include a source 510, an absorber 520, and a detector assembly 530 including a transmission detector 532 and two sidescatter detectors 534, which can be contained in a housing 550. The structure and function of the differential gravimeter 500 can be similar to the differential gravimeter 400 of FIG. 4, except for, for example, the magnetic modulator 540 which is used instead of a mechanical modulator.

In this embodiment, the magnetic modulator 540 includes a magnetic field coil that can be operatively connected to the source 510 to generate external magnetic field(s). The external magnetic field(s) generated can help compensate the frequency shift of the gamma radiation emitted from the source 510 by tuning it. In some embodiments, the external magnetic field(s) can shift the spectral frequency of gamma radiation using the quantum-mechanical effect of Zeeman splitting, where interaction energies of the couplings between the nuclear magnetic moments of isotope atoms and the external magnetic field(s) can be modulated. Such magnetic modulation can split a spectral line into multiple energy sub-levels and allow the energy difference of the magnetic splittings to account for the gravitational frequency shift so photons can be resonantly absorbed. The Zeeman splitting effect is known in the art.

Figure 5B:
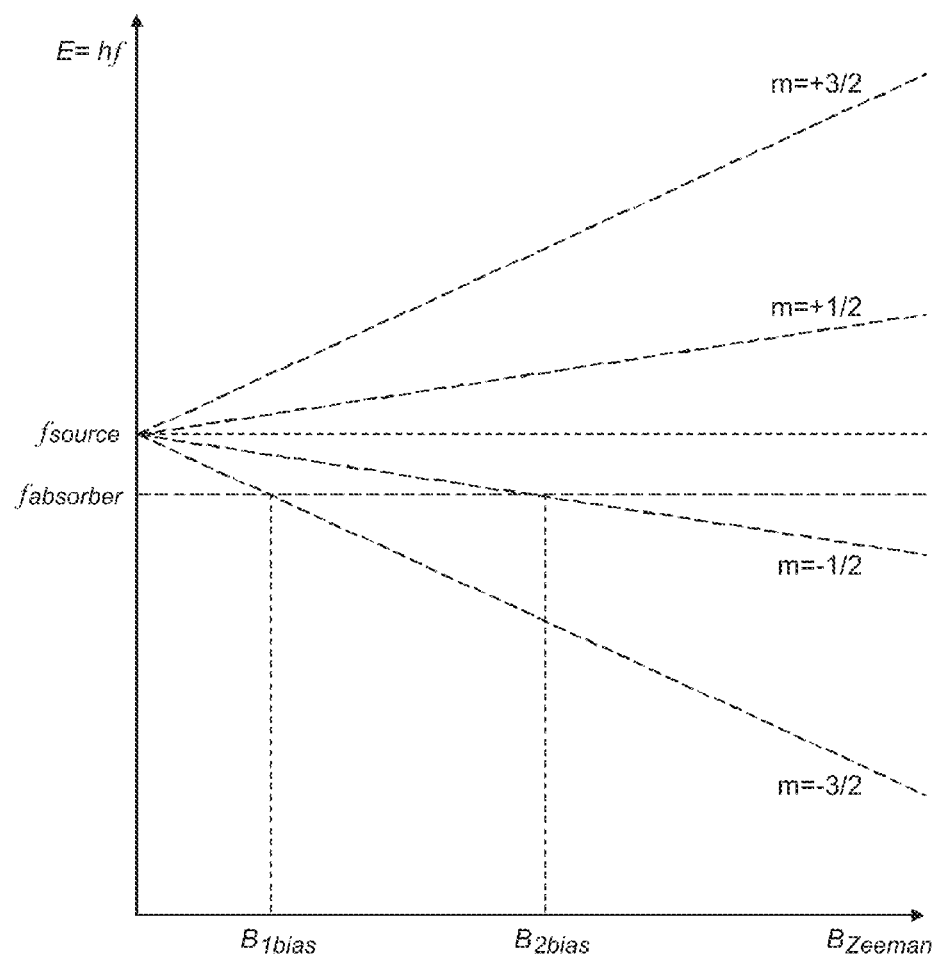
FIG. 5b illustrates an example of Zeeman splitting of a spectral line with four-fold degeneracy (j=3/2).

In one embodiment, as shown in FIG. 5b, the gamma radiation travelling from a source to an absorber has a frequency shift of ($f_{absorber} - f_{source}$). The spectral line of the source or absorber can have a four-fold degeneracy with the total nuclear angular momentum $j=3/2$. In the presence of an external magnetic field $B_{Zeeman}$, the single spectral line of the source/absorber can be split into four sub-spectral lines, as denoted by the z-component $m(m=+3/2, +1/2, -1/2, -3/2)$ of the total angular momentum. The magnitude of the magnetic splitting can be a function of the external magnetic field $B_{Zeeman}$. For example, when $B_{Zeeman}=B_{1bias}$, the splitting of the spectral line with $m=-3/2$ can compensate the gravitational frequency shift. As another example, when $B_{Zeeman}=B_{2bias}$, the splitting of the spectral line with $m=-1/2$ can compensate the gravitational frequency shift.

Such external magnetic field(s) can be controlled to tune the frequency of the gamma radiation without moving the source 510 or the absorber 520. In one embodiment, the magnetic field can be generated, for example, inside a solenoidal coil around the source 510 by an electric current. The intensity of the electric current can be adjusted to determine the magnetic-field strength. The electric current can be controlled to have a relative precision of, for example, one part in 1000 or better. For example, a 1 mA current can be controlled with a precision of ±1 μA or better.

The magnetic field(s) generated can include a superposition of two components, e.g., a baseline component and an oscillating component. The baseline component can be a substantially constant field that can impose a bias to shift a spectral line of the radiation by a determined amount against a zero-field reference. In one embodiment, the baseline component can cause a splitting of a spectral line by coupling nuclear magnetic moments to electron magnetic moments. The baseline component can be, for example, a few hundred Gauss or milli-Tesla. It will be appreciated that the baseline component of other magnitudes can be used to split the spectral line.

The baseline component can serve to compensate for a majority of the frequency shift due to the gravitational potential difference between the positions of a source and an absorber, such as the source 510 and the absorber 520. For example, if the position of the source 510 has a lower gravitational potential than the position of the absorber 520, the gamma radiation travelling from the source 510 to the absorber 520 has a red shift in terms of frequency. A magnetic modulator, such as the magnetic modulator 540, can be operatively connected to the source 510 and a constant baseline component of a magnetic field generated can shift the frequency of the radiation from the source 510 upward to compensate the red shift.

The gravitational potential difference may depend on a tilt angle of the gravimeter against a gravitational vertical. To compensate the frequency shift, the baseline component can be adjustable by, e.g., controlling electric current, according to the tilt angle of the gravimeter against the gravitational vertical. In one embodiment, the tilt angle can be measured by a tilt meter, for example, a triaxial accelerometer, which can determine the angle within a resolution of, for example, about 0.1 degree or better. It will be appreciated that the tilt angle can be measured by a tilt meter other than a triaxial accelerometer. A processor operatively connected to the gravimeter 500, such as the processor 108 of FIG. 1, can have a module such as the module 108a shown in FIG. 1 to determine a dependence of the baseline component on the tilt angle.

The oscillating component of the magnetic field can then sweep the spectral line of the radiation over a frequency range to compare the source and absorber spectral resonance frequencies. The oscillating component may be considerably weaker than the baseline component. For example, the oscillating component may have the amplitude of a few percent of the baseline component. The frequency of the oscillating component can be determined based on a given source, such as the source 510, and/or a given absorber, such as the absorber 520. For example, the frequency of the oscillating component can be around 10-100 MHz for $^{57}$Fe, and around 10-100 kHz for $^{67}$Zn. The oscillating component may follow a shaped pulse, for example, a triangular or saw-tooth pulse that can linearly sweep the spectral frequency of the source and/or the resonant spectral frequency of the absorber so as to compare the frequencies of the source and the absorber. It will be appreciated that pulses other than triangular or saw-tooth shaped can also be used.

Some sources, e.g., $^{109}$Ag, can emit gamma radiation having such a narrow line width that the Earth's magnetic field can split the spectral line of gamma radiation into components. Some sources, e.g., $^{57}$Fe and $^{67}$Zn, have relatively wider line width that the Earth's magnetic field can broaden the spectral line. In some embodiments, the magnetic modulator may generate a magnetic field having a component to compensate for the Earth's magnetic field. For example, the magnetic modulator 540 may include magnetic coil(s) to compensate for a component of the Earth's magnetic field, e.g., in line with an axis of a gravimeter. In one embodiment, the Earth's magnetic field is measured as a three-component vector at a well site by a triaxial magnetometer. The Earth's magnetic field can be assumed to be valid in a volume around the wellsite that includes multiple wells drilled from the well site. A relevant magnetic-filed component can be in line with an axis of a gravimeter.

In one embodiment, the magnetic modulator 540 is operatively connected to the source 510 such that the magnetic field(s) generated can be around the source 510. In other embodiments, the magnetic modulator 540 can be operatively connected to the absorber 520 so that the magnetic field(s) generated can be around the absorber 520. In some embodiments, the baseline component and the oscillating component may be decoupled and separately installed around the source 510 and/or the absorber 520.

The differential gravimeter described herein can measure a gravitational potential, which is scalar, different from a vector-valued gravitational force. The differential gravimeter described herein may not have to be aligned with a direction of gravity. For example, the differential gravimeter described herein may be used in a deviated or horizontal wellbore to monitor density changes in a geological formation, such as lateral fluid fronts replacing gas or water.

Figure 6:
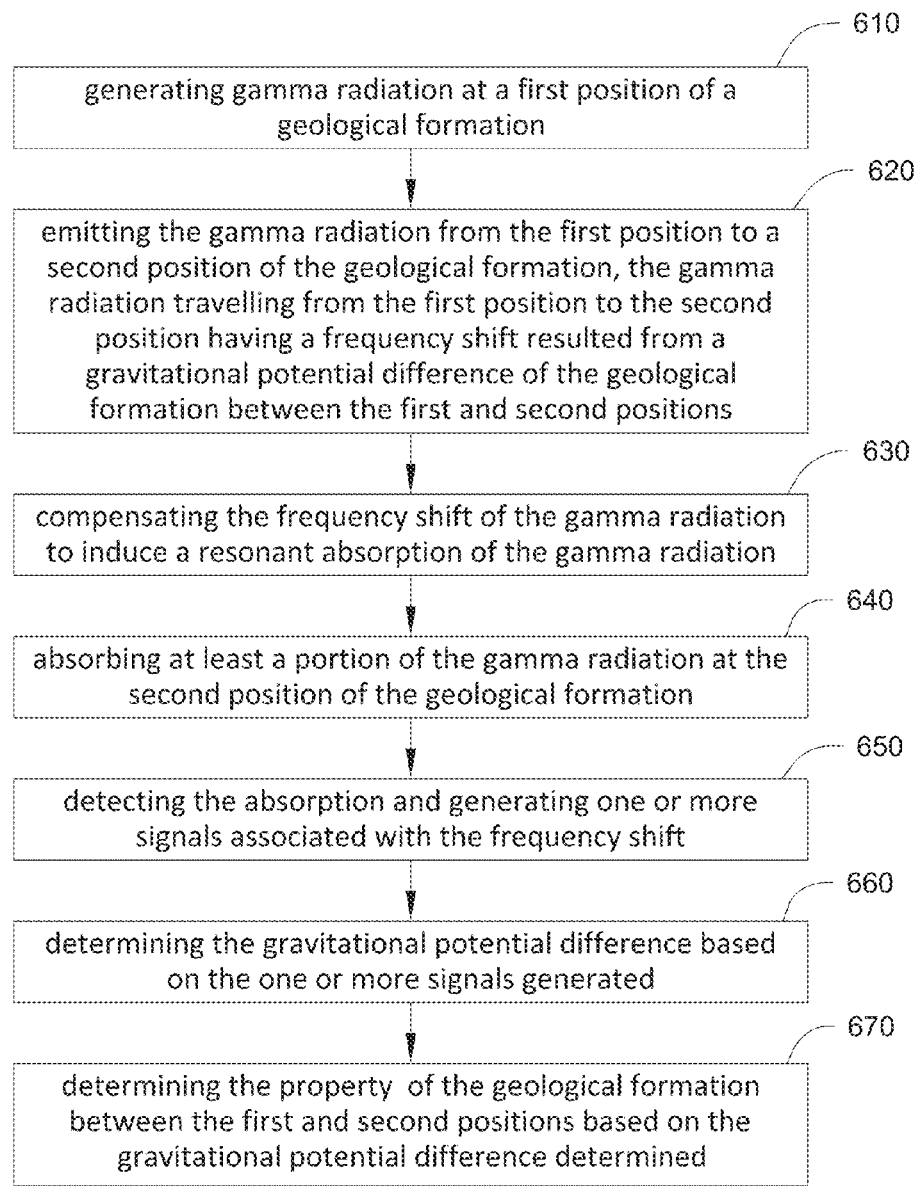
FIG. 6 illustrates a flow diagram of one embodiment for determining a property of a geological formation.

FIG. 6 illustrates a flow diagram of an example method for determining a property of a geological formation. It will be appreciated that the method of FIG. 6 can be implemented in any system and/or component described in FIGS. 1-5.

At block 610, a source, such as the source 102, 410, 510, generates radiation, for example, gamma radiation, at a first position of a geological formation, such as the geological formation 202, 302.

At block 620, the gamma radiation is emitted from the first position through, for example, a housing such as the housing 450, 550, optionally filled with helium, to a second position of the geological formation. The gamma radiation travelling from the first position to the second position has a frequency shift resulted from a gravitational potential difference of the geological formation between the first and second positions.

At block 630, the frequency shift of the gamma radiation can be compensated by a tuning mechanism, such as the mechanical modulator 440, and/or the magnetic modulator 540, to induce a resonant absorption of the gamma radiation. It is to be understood that tuning mechanisms other that the mechanical modulator and the magnetic modulator can also be used to compensate the frequency shift.

At block 640, at least a portion of the gamma radiation is absorbed with the absorber, such as the absorber 104, 420, 520, at the second position. The frequency shift of the gamma radiation can be compensated such as by step at block 630 so that the gamma radiation can be resonantly absorbed by the absorber.

At block 650, the absorption of the gamma radiation is detected by a detector, such as the detector assembly 430, 530. In one embodiment, a diminishing of radiation intensity can be detected with a transmission detector such as the transmission detector 432, 532, for example, by detecting a reduced photon flux in a forward direction after the gamma radiation is absorbed by an absorber, such as the absorber 420, 520. In another embodiment, photons re-emitted by an absorber upon the absorption can be detected away from the forward direction by one or more side-scatter detectors, such as the side-scatter detectors 434, 534. The detector assembly then generates at least one signal associated with the frequency shift due to the gravitational potential difference.

At block 660, the gravitational potential difference can be determined by a processor, such as the processor 230, 330, 108, from the at least one signal generated by the detector assembly. It is to be understood that one or more processors can be used to determine the gravitational potential difference.

At block 670 the processor can determine a property of the geological formation from the gravitational potential difference determined. For example, a density of the geological formation can be determined from the gravitational potential difference. The conversion from a gravitational potential difference determined to a density of a geological formation can be achieved, e.g., by a method that utilizes a concentric spherical shell model, as described further below. It will be appreciated that formation properties other than the formation density, such as changes of fluid compositions, can also be determined from the gravitational potential difference.

Figure 7:
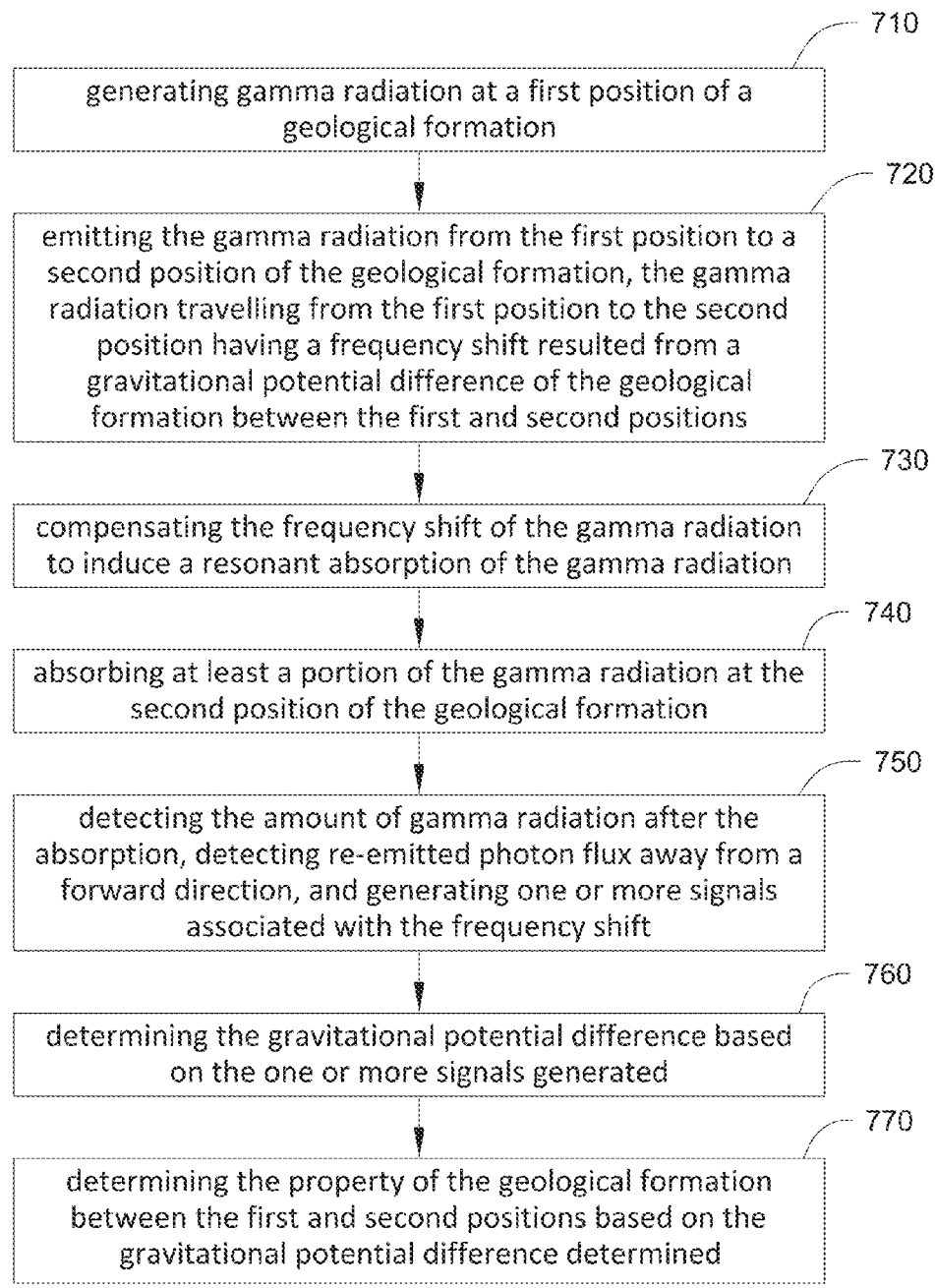
FIG. 7 illustrates a flow diagram of one embodiment for determining a density of a geological formation.

FIG. 7 illustrates a flow diagram of one example of a method for determining a density of a geological formation. It will be appreciated that the method of FIG. 7 can be implemented in any system and/or component described in FIGS. 1-5.

The method of FIG. 7 can be similar to the method of FIG. 6 except for, for example, the additional of another detecting step. At block 710, similar to the block 610, a source, such as the source 102, 410, 510, generates radiation, for example, gamma radiation, at a first position of a geological formation, such as the geological formation 202, 302.

At block 720, similar to the block 620, the gamma radiation is emitted from the first position through, for example, a housing such as the housing 450, 550 filled with helium, to a second position of the geological formation. The gamma radiation travelling from the first position to the second position has a frequency shift resulted from a gravitational potential difference of the geological formation between the first and second positions.

At block 730, similar to the block 630, the frequency shift of the gamma radiation can be compensated by a tuning mechanism, such as the mechanical modulator 440, and/or the magnetic modulator 540, to induce a resonant absorption of the gamma radiation.

At block 740, similar to the block 640, at least a portion of the gamma radiation generated by the gamma radiation at the first position is absorbed with an absorber, such as the absorber 104, 420, 520. The frequency shift of the gamma radiation can be compensated such as by the step at the block 730 so that the gamma radiation can be resonantly absorbed.

At block 750, the absorption of the gamma radiation is detected by a detector, such as the detector assembly 430, 530. In one embodiment, a diminishing of radiation intensity can be detected in a forward direction, such as at the block 650. In addition, photons re-emitted by an absorber upon the absorption can be detected away from the forward direction. The detector generates at least one signal associated with the frequency shift due to the gravitational potential difference.

At block 760, similar to the block 660, the gravitational potential difference can be determined by at least one processor, such as the processor 108, 230, 330, from the at least one signal generated by the detector assembly.

At block 770, similar to the block 670, the at least one processor can determine a property of the geological formation from the gravitational potential difference determined. For example, a formation density of geological formation can be determined from the gravitational potential difference. It will be appreciated that a property of the geological formation is not limited to the formation density. Properties of the geological formation other than the formation density, such as changes of fluid composition therein, can be determined from the gravitational potential difference determined.

Figure 8:
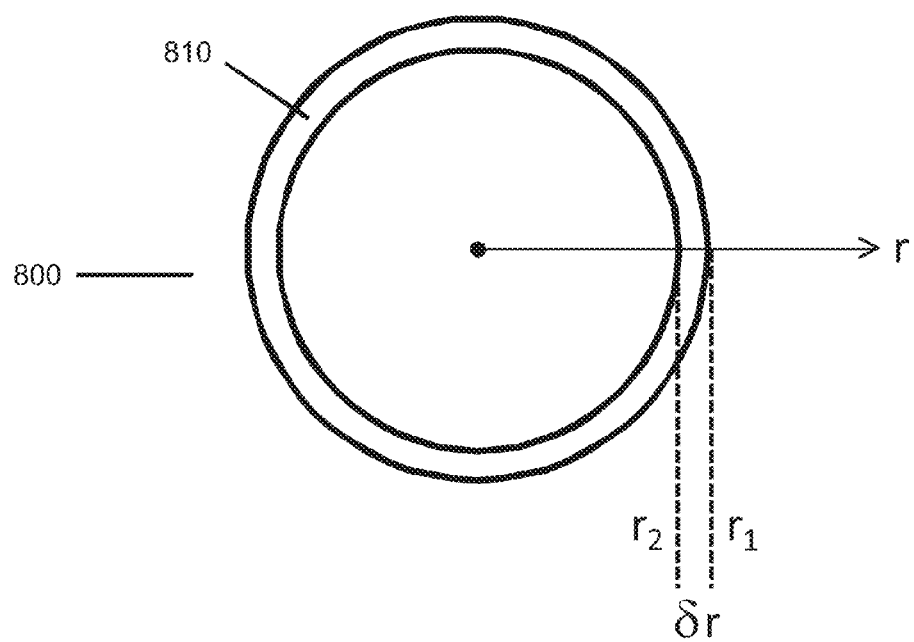
FIG. 8 illustrates a schematic diagram of an example of a concentric spherical shell model.

FIG. 8 illustrates a schematic diagram of an example concentric spherical shell model for determining a density of a geological formation from a gravitational potential difference determined. In the concentric spherical shell earth model, the earth can be represented by a generally spherical body 800 having concentric shells, e.g., the concentric shell 810. Equation (4) gives the mass contribution dm of a concentric shell at radius r as:

$$dm = 4\pi r^2 \rho(r) dr \qquad (4)$$

where $\rho(r)$ is a density at radius r. The total mass m of the sphere out to a radius $r_0$ is:

$$m(r_0) = 4\pi \int_0^{r_0} r^2 \rho(r) dr \qquad (5)$$

This mass $m(r_0)$ gives a gravitational potential $\Phi(r_0)$ up to an arbitrary constant C:

$$\Phi(r_0) = \frac{Gm(r_0)}{r_0} + C \qquad (6)$$

where G is the gravitational constant.

Between two radii $r_1$ and $r_2$ (with $r_1 > r_2$) the difference in the gravitational potential is:

$$\Phi(r_1) - \Phi(r_2) = \qquad (7)$$
$$\frac{Gm(r_1)}{r_1} - \frac{Gm(r_2)}{r_2} = 4\pi G \left( \frac{1}{r_1} \int_0^{r_1} r^2 \rho(r) dr - \frac{1}{r_2} \int_0^{r_2} r^2 \rho(r) dr \right)$$

The concentric spherical shell model may assume that between two close-by radii the density is generally a constant, corresponding to an average density $\rho_{ave}$. The gravitational potential difference in Equation (7) can be simplified to:

$$\Phi(r_1) - \Phi(r_2) = 4\pi G \left( \left( \frac{1}{r_1} - \frac{1}{r_2} \right) \int_0^{r_2} r^2 \rho(r) dr + \frac{\rho_{ave}}{r_1} \int_{r_2}^{r_1} r^2 dr \right) = \qquad (8)$$
$$\frac{4\pi G \rho_{ave}}{3 r_1} (r_1^3 - r_2^3) - 4\pi G m(r_2) \frac{r_1 - r_2}{r_1 r_2}$$

The second term $$4\pi G m(r_2) \frac{r_1 - r_2}{r_1 r_2}$$

is a free-air gradient in terms of the gravitational potential. It will be appreciated that a free-air gradient for Newton-gravimetry force measurements has a different formula.

The vertical distance $\delta r = r_1 - r_2$ can be between positions of, for example, a source and an absorber such as the source 410, 510 and the absorber 420, 520, which in some examples may be the source-absorber distance at a single log station in a vertical well. In a non-vertical well, the vertical distance for example can be the source-absorber distance multiplied by the cosine of a dip angle, e.g., a deviation angle from the vertical direction. The vertical distance $\delta r$ can be much smaller than the earth radius R. For example, the vertical distance $\delta r$ can be around several meters or less, e.g., about 1 to about 2 meters.

For an example application of the concentric spherical shell model on a differential gravimeter, such as the differential gravimeter 400, 500, and/or the differential gravimeter in the component 110, to determine a density of a geological formation from a determined gravitational potential difference, the vertical distance $\delta r$ can be determined as a vertical distance between a source and an absorber, for example, a vertical distance between the source 410 and the absorber 420, or a vertical distance between the source 510 and the absorber 520. It is to be understood that the vertical distance depends on an orientation of the differential gravimeter. For example, a differential gravimeter can be in a non-vertical orientation where the vertical distance between the source and the absorber therein can be determined based on the non-vertical orientation.

With $r_1 = r_2 + \delta r = r + \delta r$, the gravitational potential difference can become:

$$\Phi(r_1) - \Phi(r_2) = \frac{4\pi G \rho_{ave}}{3r} ((r + \delta r)^2 + (r + \delta r)r + r^2) \delta r - 4\pi G m(r_2) \frac{\delta r}{r^2} \cong \qquad (9)$$
$$4\pi G \rho_{ave} r \delta r - 4\pi G m(r) \frac{\delta r}{r^2}$$

An average formation density $\rho_{ave}$ between the radii $r_1$ and $r_2$ can be determined from the gravitational potential difference $\delta\Phi(r) = \Phi(r_1) - \Phi(r_2)$ as:

$$\rho_{ave} = \frac{1}{4\pi G r} \frac{\delta\Phi(r)}{\delta r} + \frac{m(r)}{r^3} \qquad (10)$$

The average formation density $\rho_{ave}$ can be determined with an accuracy $\Delta\rho_{ave}$, for example, about $\pm 0.01$ g/cm$^3$. Given the accuracy $\Delta\rho_{ave}$ of about $\pm 0.01$ g/cm$^3$, a corresponding measurement precision for the gravitational potential difference $\delta\Phi(r)$ can be about 4% of a measurement precision of the free-air gradient. In one embodiment, the measurement precision for the gravitational potential difference δΦ(r) can be around 5.3 m²/s² or better which can correspond to a density error of about 0.01 g/cm³ or less.

In some embodiments, a density ρ of a geological formation, such as the above average formation density $\rho_{ave}$, between a first and a second positions such as the above $r_1$ and $r_2$, can be determined by a generally monotonically increasing function of the gravitational potential difference determined. Such function can be linear or non-linear. A Taylor series can be used to represent the non-linear function. In one embodiment, a lowest-order linear approximation of the Taylor series can be used to determine the density ρ:

$$\rho = a\frac{\Delta\Phi}{d} + b \quad (11)$$

wherein ΔΦ is the gravitational potential difference determined, d is a vertical distance between the first and second positions, and a and b are coefficients. A specific example of such general relationship in Equation (11) is illustrated by Equation (10) described above where the coefficient a can be determined by $$\frac{1}{4\pi GR}$$

and the coefficient b can be determined by $$\frac{M}{R^3},$$

with G being the gravitational constant, R being the earth radius, and M being the earth mass. It will be appreciated that the format of said general relationship between formation density and gravitational potential difference may vary without changing its substance.

Generally, the differential gravimetry measurement processes described herein, including, for example, photon emission, propagation and absorption, can operate over time intervals of a few tens to hundreds of nanoseconds (ns), which is much faster than the typical shock spectrum of millisecond (ms) events encountered in, for example, measurement-while-drilling (MWD) or logging-while-drilling (LWD). The differential gravimeters described herein may operate even during the drilling process and in relatively harsh environments including conditions of high temperature, pressure, shock and vibrations encountered for example in MWD/LWD. Furthermore, the gravimeters may well be suited for the mechanically hostile MWD/LWD environment.

The differential gravimeter described herein may also be implemented as a stationary gravimeter, either for various surface measurements, or as permanently installed downhole gravimeter for long-duration time-lapse surveys.

The system and method described herein may be embodied in other forms without departing from the spirit or novel characteristics thereof. The embodiments disclosed in this application are to be considered in all respects as illustrative and not limitative. The scope of the description is indicated by the appended claims rather than by the foregoing description; and all changes which come within the meaning and range of equivalency of the claims are intended to be embraced therein.

The invention claimed is:

1. A system for determining a property of a geological formation, the system comprising:
    a component disposed about a downhole tool, the component to measure a frequency shift of gamma radiation travelling from a first position of the component to a second position of the component, the frequency shift resulted from a gravitational potential difference between the first position and the second position, which correspond to respective positions of the geological formation, the component including:
        a source positioned at the first position, the source to emit gamma radiation from the first position to the second position,
        an absorber positioned at the second position, the absorber to absorb at least a portion of the gamma radiation emitted from the source,
        a tuning mechanism operatively connected to at least one of the source and the absorber, the tuning mechanism to compensate the frequency shift and induce a resonant absorption of the gamma radiation emitted from the source by the absorber, and
        one or more detectors operatively connected to the absorber, the detectors to detect the absorption of the gamma radiation with the absorber and to generate at least one signal associated with the frequency shift; and
    at least one processor operatively connected to the detectors, the at least one processor to receive the at least one signal generated, determine the gravitational potential difference from the at least one signal received, and determine the property of the geological formation between the first and second positions based on the gravitational potential difference determined.

2. The system of claim 1, wherein the tuning mechanism comprises a mechanical modulator to move the absorber or the source relative to each other.

3. The system of claim 1, wherein the tuning mechanism comprises a magnetic modulator to generate a magnetic field around the source or the absorber to generate a magnetic splitting of the gamma radiation.

4. The system of claim 3, wherein the magnetic field comprises a baseline component and an oscillating component.

5. The system of claim 4, wherein the baseline component is adjustable according to a tilt angle of the component against a gravitational vertical.

6. The system of claim 4, wherein the baseline component is adjustable to compensate for an earth magnetic field.

7. The system of claim 1, wherein the one or more detectors comprise at least one transmission detector to detect a reduced photon flux due to the absorption of the gamma radiation with the absorber and/or at least one side-scatter detector to detect a re-emitted photon flux away from a forward direction of the gamma radiation.

8. The system of claim 1, wherein the at least one processor comprises a module to determine a dependence of the gravitational potential difference on an orientation of the component with respect to a gravitational vertical.

9. The system of claim 1, wherein the downhole tool further comprises a housing to contain the component, the housing includes helium to reduce absorption of the gamma radiation before absorption by the absorber.

10. The system of claim 1, wherein the downhole tool comprises a wireline tool, a measurement-while-drilling tool, a logging-while-drilling tool, a coiled tubing tool, a testing tool, a completions tool, a production tool, or combinations thereof.

11. The system of claim 1, wherein the source and the absorber each include at least one isotope of $^{57}$Fe, $^{67}$Zn, $^{109}$Ag, $^{107}$Ag, $^{103}$Rh, and $^{189}$Os.

12. A method for determining a property of a geological formation, the method comprising:
- generating gamma radiation at a first position of the geological formation;
- emitting the gamma radiation from the first position to a second position of the geological formation, the gamma radiation travelling from the first position to the second position having a frequency shift resulted from a gravitational potential difference of the geological formation between the first and second positions;
- compensating the frequency shift of the gamma radiation to induce a resonant absorption of the gamma radiation;
- absorbing at least a portion of the gamma radiation at the second position of the geological formation;
- detecting the absorption of the gamma radiation and generating one or more signals associated with the frequency shift;
- determining the gravitational potential difference based on the one or more signals generated; and
- determining the property of the geological formation between the first and second positions based on the gravitational potential difference determined.

13. The method of claim 12, wherein compensating the frequency shift comprises generating a mechanical movement of a source and/or an absorber.

14. The method of claim 12, wherein compensating the frequency shift comprises generating a magnetic field around a source and/or an absorber to generate a magnetic splitting of the gamma radiation.

15. The method of claim 14, wherein the magnetic field comprises a baseline component and an oscillating component.

16. The method of claim 15, wherein the baseline component is adjustable according to a tilt angle with respect to a gravitational vertical.

17. The method of claim 12, wherein detecting the absorption comprises detecting a reduced photon flux in a forward direction of the gamma radiation.

18. The method of claim 12, wherein detecting the absorption comprises detecting a re-emitted photon flux away from the forward direction of the gamma radiation.

19. The method of claim 12, wherein the gamma radiation is generated or absorbed by at least one isotope of $^{57}$Fe, $^{67}$Zn, $^{109}$Ag, $^{107}$Ag, $^{103}$Rh, and $^{189}$Os.

20. The method of claim 12, wherein the property of the geological formation comprises a formation density of the geological formation.

* * * * *